Figure 1:
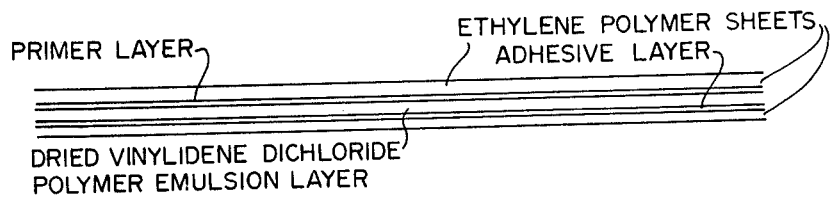

United States Patent [19]

Cook et al.

[11] 4,096,946

[45] Jun. 27, 1978

[54] LAMINATE FOR USE IN PACKING OIL

[75] Inventors: Herbert G. Cook; Jack A. McAvity, both of Toronto, Canada

[73] Assignee: E.S. & A. Robinson (Canada) Ltd., Toronto, Canada

[21] Appl. No.: 667,030

[22] Filed: Mar. 15, 1976

Related U.S. Application Data

[63] Continuation of Ser. No. 506,582, Sep. 16, 1974, abandoned, which is a continuation of Ser. No. 277,049, Aug. 1, 1972, abandoned.

[51] Int. Cl.$^2$ ............................................. B65D 75/26
[52] U.S. Cl. .................. 206/484.2; 206/524.2; 426/127; 428/35; 428/337; 428/339; 428/340; 428/483; 428/518
[58] Field of Search ............. 206/84, 484, 384, 484.2, 206/524.2; 156/306; 53/373; 220/84; 215/1 C, 12 R; 229/3.5 R; 426/129, 136, 127, 106, 415; 428/518, 482, 483, 35; 427/302, 322, 428

[56] References Cited

U.S. PATENT DOCUMENTS 2,781,900  2/1957  Snyder et al. ..................... 206/525
3,676,185  7/1972  Phillips et al. ..................... 428/340
3,741,253  6/1973  Brax et al. ........................ 138/141

FOREIGN PATENT DOCUMENTS 743,024   9/1966   Canada.
1,013,211 12/1965  United Kingdom.

*Primary Examiner*—Stanley S. Silverman
*Attorney, Agent, or Firm*—Cushman, Darby & Cushman

[57] ABSTRACT

A laminate, which has improved resistance to the passage of oil therethrough and which is suitable for the packaging of oleaginous substances, particularly motor oil, is described. The laminate comprises a pair of outer layers of a solid ethylene polymer, such as polyethylene or copolymers of ethylene with propylene or butene-1, and at least one inner barrier layer of a dried emulsion coating of a vinylidene chloride copolymer, the inner barrier layer being bonded to the inner surfaces of the outer layers. One of the outer layers may be bonded to the inner barrier layer by means of an oil-resistant adhesive, or, in the case where there are two inner barrier layers, the inner layers may be bonded together by an oil-resistant adhesive between the dried emulsion coatings.

8 Claims, 2 Drawing Figures

LAMINATE FOR USE IN PACKING OIL

This is a continuation of application Ser. No. 506,582, filed Sept. 6, 1974, now abandoned, which is a continuation of Ser. No. 277,049, filed Aug. 1, 1972, now abandoned.

The present invention relates to flexible sheet packaging material. In particular the present invention relates to a flexible sheet laminate material suitable for packaging commodities and particularly for packaging oleaginuous materials such as motor oil.

Polyethylene sheet material has found widespread use as a wrapping and packaging material for many articles of commerce because of its flexibility transparency, low moisture vapour permeability, resistance to the action of many chemicals and similar properties. However, polyethylene sheet is permeable to oil and thus is unsuitable for packaging oleaginous materials particularly motor oil.

Proposals have been made for improving the resistance of polyethylene sheet to inter alia oleaginous materials by applying a coating to the polyethylene sheet of a polymer of vinylidine chloride such as saran which act as a barrier to the passage of such oils. Such a laminate is disclosed for example in Canadian Pat. No. 797,904 issued Oct. 29, 1968 to Union Carbide Corporation.

However, it has been found that such a coated polyethylene sheet is subject to disadvantages which make it unsuitable for the packaging of oleaginous materials particularly motor oil. In particular it has been found that the coating vinylidine chloride polymer on the polyethylene sheet in a sufficient amount to substantially inhibit the passage of oil therethrough causes the polyethylene to lose elasticity and become brittle and susceptible to tearing such that a package formed from such a coated polyethylene sheet containing motor oil is easily ruptured which is undesirable. Further it is difficult to form the required heat seals in the manufacture of a bag from the coated sheet material and the heat seals so formed are readily rupturable. As a result, bags formed from such sheet material and containing liquid, such as motor oil, are incapable of standing up to a standard drop test i.e. they rupture when filled with a liquid and are dropped from a selected height and are thus rejected by the oil industry. Further, in order to provide adequate resistance to the passage of oil the thickness of the vinylidine chloride polymer coating has to be substantial which aforesaid reduces the elasticity and flexibility of the polyethylene film.

The present invention provides a laminate which is suitable for the packaging of oleaginous materials, particularly motor oil, which has improved resistance to the passage of oil therethrough, is capable of withstanding the drop test without rupture thereof either at the heat seals or in the walls of a bag formed therefrom and is capable of being handled on conventional packaging equipment, i.e., has characteristics, such as stiffness, such that it handles readily on packaging equipment which is available on the market such as equipment which is conventionally used for the packaging of milk in pouches with a minimum of modification.

Accordingly to the present invention therefore there is provided a sheet material for use in the packaging of leaginous materials which is a laminate comprising outer layers of a solid ethylene polymer and at least one inner layer of a dried emulsion coating of a vinylidene chloride polymer bonded to the inner surfaces of said outer layers, (said layers being of essentially uniform thickness).

The present invention also includes a package for containing oleaginous materials as well as a package containing such oleaginous materials formed from the aforesaid sheet material.

The present invention still further provides a method of forming the aforesaid sheet material which comprises applying to a first sheet of a solid ethylene polymer an aqueous emulsion of a vinylidine chloride polymer, allowing said emulsion to dry, and hot pressing a second sheet of a solid ethylene polymer into contact with said first sheet of said ethylene polymer with an adhesive between said second sheet and said dried emulsion.

The ethylene polymer film used as the inner and outer layers of the laminate in accordance with the present invention is not limited to unmodified polyethylene such as low density polyethylene but is preferably a copolymer such as produced from mixtures of ethylene, propylene or butene monomers or polymers. The ethylene polymer more preferably is a copolymer of ethylene and butene and a film supplied under the trade designations M1 or M3 by E.I. DuPont de Nemours & Co., provides a laminate with enhanced toughnesss and stretchability, is capable of heat sealing through oil and has high slip properties making the laminate readily handleable on conventional packaging machines. Preferably the inside layer of the laminate in forming the packing is formed of M1 film which is a low slip film and is easier to coat the outside layer is formed of M3 film which is a high slip film. The sheets of ethylene polymer desirably have a thickness in the range 1 to 5 mils and preferably in the range 2 to 4 mils, the inner layer more preferably having a thickness of about 3 mils and the outer layer having a thickness of about 2 mils. Desirably the overall thickness of the laminate is not greater than about 7 mils.

It is a critical feature of the present invention that the vinylidine chloride polymer layer be applied from an aqueous emulsion suitably containing 30 to 60% solids. As representative examples of the classes of vinylidine chloride copolymers useful in the coating composition for use in the process of the present invention there may be mentioned copolymers of vinylidine chloride with acrylonitrile, methacrylonitrile, methylacrylate, ethylacrylate, butylacrylate, isobutylacrylate, methylmethacrylate, ethylmethacrylate, butylmethacrylate, isobutylmethacrylate, methyl vinyl ketone, vinyl acetate, vinyl chloride, styrene, dichlorochloride chloride, chloroprene and butadiene. Generally the copolymer should contain not less than about 50% by weight of vinylidine chloride. A suitable vinylidine chloride copolymer is saran which may be in the form of an emulsion supplied under the trademark Daran 225 from Dewey and Almy. The emulsion is suitably applied to the ethylene polymer film in an amount in the range 2 to 8 lbs. per 3000 sq. ft. and preferably in the range 3 to 4 lbs. per 3000 sq. ft. of film. When applied in an amount below about 2 lbs. per 3000 sq. ft. of ethylene polymer film it is found that the barrier properties of the film to the passage of oil therethrough oil deteriorates significantly and when applied in amounts above 8 lbs. per 3000 sq. ft. of film, the film tends to become brittle subject to rupture and not readily handleable in conventional packaging machines.

It is found that the presence of the inner layer of the polymer vinylidene chloride as a dried emulsion coating is superior to other types of inner layers of vinylidene chloride polymer for the barrier between the outer ethylene polymer layers in the laminate. It is found that when the inner layer is provided as a coating from solution the solvent forming the solution is difficult to remove from the ethylene polymer film forming the outer layer and in drying the coating some solvent is retained in the laminate. Thus residual solvent may effect the bond between the layers in the laminate and may also affect the contents of the bag subsequently formed the laminate, many solvents being deleterious to oleaginous materials such as motor oil. Further, it is necessary in forming the inner layer for solution to drive off the solvent usually by heating. Such heating deteriorates the ethylene polymer film and also the solvent driven off will pollute the immediate atmosphere which is undesirable. Again, it is found that with the emulsion coating it is possible to obtain a higher solids loading of the dried coating forming the inner layer to give a heavier coat in a single application and a better oil barrier properties in the laminate with a smaller gauge vinylidene chloride coating.

Coextrusion of the layers of the laminate and in particular extrusion of molten vinylidene chloride dichloride polymer provides an inferior barrier as compared with emulsion coating at the same gauge for oil. In particular, it is normally necessary with such coextrusion to have a plasticizer present in the vinylidene chloride inner layer which reduces the oil barrier properties of the vinylidene chloride inner layer. Such plasticizer is not present in dried vinylidene chloride polymer emulsion coating. It is also difficult to achieve a coating of small gauge with coextrusion and further it is impossible with coextrusion to provide printing of the inside surface of the ethylene polymer layers which, of course, is desirable and possible with emulsion coating of the vinylidene chloride polymer layer.

Lamination of the films to form the lamination has the disadvantage that the vinylidene chloride polymer film is difficult to handle due to inherent static electricity. The vinylidene chloride polymer film will also normally require a plasticizer which as aforesaid reduces the oil barrier properties of the vinylidene chloride polymer layer. Again the laminations of films to form the laminate is an expensive procedure.

It is a critical feature of the present invention that the vinylidene chloride polymer coating forming the inner layer is disposed between the pair of outer layers of solid ethylene polymer. The two outer layers have been found to provide the laminate with good flexibility such that the laminate is capable of withstanding the aforesaid drop test. The additional ethylene polymer outer layer also provides good soft flexible seals in the formation of the bag on the conventional packaging machines whether or not the edges are sealed in overlap style or with a film seal to form the tube from which the bags are made as the heat seal is between the ethylene polymer outer layers. The transverse seal across the tube so formed to form the bag from the tube is also a seal between the ethylene polymer outer layers which again is a good soft flexible seal. The soft flexible seals in the filled bags provide improved resistance to breakage and rupture during shipment thereof. It is further found that the additional outer layer of ethylene polymer which in itself is permeable to oil also improves the barrier properties of the laminate to oil.

While the aqueous vinylidene chloride polymer emulsion may be applied directly to the ethylene polymer film to provide a dried emulsion coating thereon the bonding of the dried emulsion coating to the ethylene polymer film may be variable and it is sometimes desirable to apply a primer to improve the bonding of the dried vinylidene chloride polymer emulsion to the film. This primer besides improving the bonding provides a uniform bonding between the coating and the polyethylene film. Such primers are known in the art as disclosed in Canadian Pat. No. 833,494 issued Feb. 3, 1970 to National Distillers, U.S. Pat. No. 3,231,411 issued Jan. 25, 1966 to R. B. Tyler et al and U.S. Pat. No. 2,968,576 issued Jan. 17, 1961 to Keller et al. Further, in order to improve the bonding of the vinylidene chloride polymer emulsion coating to the film, the film may be suitably subjected to corona discharge before application of the primer.

The primer may be applied to the film by gravure wire rod and roller coating such a primer being an isocyanate prepolymer trade supplied under the designation NA141K by Talon Adhesives Corporation.

Satisfactory bond strength between the additional outer polyethylene layer and the emulsion may be achieved by coating the emulsion coated layer with an adhesive which is preferably an oil resistant adhesive which adhesives are well known in the art and are disclosed for example in U.S. Pat. No. 3,445,324 to Curler et al. issued May 20, 1969. Suitably the adhesive is crosslinkable polymer adhesive such as polyester adhesive. The adhesive is suitably applied in an amount of 0.1 to 4 lbs. dry weight per 3000 sq. ft. of the ethylene polymer film and more preferably in amount from 1 to 2 lbs. per 3000 sq. ft. of ethylene polymer film. A particularly useful adhesive is the one supplied under the trademark Unoflex by Polymer Industries, Inc.

In accordance with one embodiment of the present invention there is a single dried emulsion coating of a vinylidene chloride polymer attached to the inner surface of one of the sheets of the ethylene polymer suitably by means of a primer and to the other sheet by means of the adhesive.

In accordance with another embodiment of the present invention the inner surfaces of both sheets of ethylene polymer have attached thereto suitably by means of a primer a dried emulsion coating of a vinylidene chloride polymer with the adhesive between the dried emulsion coatings. The second dried emulsion coating of the vinylidene chloride polymer improves the barrier properties of the laminate to the passage of inter alia oleaginous substances but increases the cost of manufacture of the laminate. In providing such a laminate the process of the invention would be modified to coat both sheets of ethylene polymer with a dried layer of the vinylidene chloride polymer the laminate then being fed with the adhesive between the dried coats.

While the flexible sheet material of the present invention is primarily useful for packaging oleaginous material such as motor oil, it may be used generally for packaging of other materials such as for example, vacuum packaging of food materials such as cheese and meat, as it has good moisture and gas barrier properties.

Figure 2:
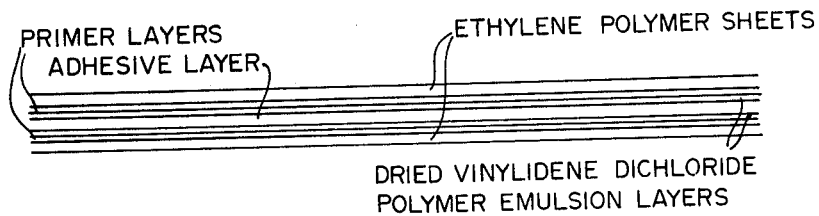

The present invention will be further illustrated by way of the following Examples in conjunction with the accompanying drawings in which:

FIG. 1 is a diagrammatic section through a laminate according to one embodiment of the present invention, and FIG. 2 is a section through a laminate according to a second embodiment of the present invention.

EXAMPLE 1

A roll 3 mill ethylene polymer film supplied under the trademark M1 by E. I. DuPont de Nemours and Co. is treated on one side by corona discharge and then passed through a coating machine at a first coating station. In the coating machine an applicator roll revolves in a fountain containing a solution of a primer supplied under trade designation NA141K by Talon Adhesive Corporation and is an isocyanate prepolymer and the solution is applied to the treated side of the film by an applicator roll. Excess solution is then removed by a wire wound rod and the primer coating on the film is dried by warm air in a tunnel through which the coated film passes. The printed film is then coated at a second coating station in a similar manner with an aqueous dispersion of a 50% solids vinylidene chloride polymer supplied under the trademark Daran 225 and the coating dried, the application being such to provide 3 lbs. of Daran 225 coating per 3000 sq. ft. of film. The coated film is then wound up.

A 25% solids solution of a thermosetting adhesive supplied under the trademark Unoflex by Polymer Industries, Inc. in a mixture of toluol and ethyl acetate is applied by a gravure cylinder to the coated side of the coated film and the solvent removed in a drying tunnel to provide an adhesive coating of 1.5 lbs. of dried adhesive per 300 sq. ft of the film. At the exit of the film from the tunnel it is contacted with the corona treated side of a 2 mol ethylene polymer film supplied under the trademark M3 by E. I. DuPont de Nemours and Co. and the flexible sheet so obtained passed through a nip of a rubber roller and a steel roller, the steel roller being at a temperature of 185° F. The laminated sheet is allowed to age for at least 24 hours to allow setting of the adhesive and the roll is then slit to appropriate dimensions for the formation of a package in a conventional machine for packaging oil such as that disclosed in U.S. Pat. No. 2,260,064. The laminate obtained is shown diagrammatically in FIG. 1.

EXAMPLE 2

The laminate was formed in a similar manner as Example 1 except that in placing of the 2 mil film of ethylene polymer supplied under the trademark M3 there is used a 3 mil film of the ethylene polymer film which before contact with the adhesive coated film is coated on that side which will contact the adhesive with a dried emulsion coating of 3 lbs. per 3000 sq. ft. of film saran 225 in a similar manner to Example 1. The laminate obtained is shown in FIG. 2.

The embodiments of the invention in which an exclusive property or privilege is claimed are defined as follows:

1. A package formed from a sheet material which is a laminate consisting essentially of outer layers of copolymer of ethylene with propylene or butene and at least one inner barrier layer consisting of a vinylidene chloride polymer in the form of a dried emulsion coating which is free of plasticizer, said barrier layer being bonded to the inner surface of said outer layers, one of said ethylene polymer layers being bonded to said dried vinylidene chloride polymer coating layer by means of an oil resistant adhesive and an oleaginous material contained within said package.

2. A package as claimed in claim 1 in which the other of said ethylene polymer outer layers of the sheet material is bonded to said single vinylidene chloride polymer coating layer by a primer coating.

3. A package as claimed in claim 1 in which said ethylene polymer layers of the sheet material have a thickness in the range of 1 to 5 mils and said dried vinylidene chloride polymer emulsion coating layer is present in an amount of 2 to 8 lbs. of resin per 3,000 sq. ft. of sheet material.

4. A package as claimed in claim 3 in which said laminate has a total thickness not exceeding 7 mils.

5. A package as claimed in claim 1 in which said ethylene polymer layers of the sheet material have a thickness in the range 2 to 4 mils and the dried vinylidene chloride polymer emulsion coating is present in an amount from 2 to 4 lbs. of resin per 3000 sq. ft. of sheet material.

6. A package as claimed in claim 1 in which said ethylene polymer of the sheet material is a copolymer of ethylene and butene.

7. A package as claimed in claim 1 containing motor oil.

8. A packaged oleaginous material contained in a sheet material which is a laminate consisting essentially of outer layers of a copolymer of ethylene with propylene or butene and
    at least one inner barrier layer consisting of a vinylidene chloride polymer in the form of a dried emulsion coating which is free of plasticizer,
said barrier layer being bonded to the inner surface of said outer layers, one of said ethylene polymer layers being bonded to said dried vinylidene chloride polymer coating layer by means of an oil resistant adhesive.

* * * * *